(12) United States Patent
Isensee et al.

(10) Patent No.: US 9,272,939 B2
(45) Date of Patent: Mar. 1, 2016

(54) DEAD PLATE ARRANGEMENT

(75) Inventors: Dennis Isensee, Lindhorst (DE);
Benedikt Felgenhauer, Herford (DE);
Waldemar Kaessner, Auetal (DE)

(73) Assignee: Heye International GmbH (DE)

( * ) Notice: Subject to any disclaimer, the term of this patent is extended or adjusted under 35 U.S.C. 154(b) by 692 days.

(21) Appl. No.: 13/611,503

(22) Filed: Sep. 12, 2012

(65) Prior Publication Data

US 2013/0104603 A1    May 2, 2013

(30) Foreign Application Priority Data

Oct. 28, 2011   (DE) .......................... 10 2011 117 169

(51) Int. Cl.
| | | |
|---|---|---|
| C03B 27/06 | (2006.01) | |
| C03B 9/453 | (2006.01) | |
| C03B 9/38 | (2006.01) | |

(52) U.S. Cl.
CPC ............. *C03B 9/4535* (2013.01); *C03B 9/3891* (2013.01)

(58) Field of Classification Search
CPC ........................... C03B 9/3891; C03B 9/4535
USPC ................................................... 65/161, 348
See application file for complete search history.

(56) References Cited

U.S. PATENT DOCUMENTS

| | | | |
|---|---|---|---|
| 2,677,919 A | | 5/1954 | Worrest |
| 3,510,288 A | | 5/1970 | Rowe et al. |
| 3,854,921 A | * | 12/1974 | Jones .............................. 65/161 |
| 4,022,604 A | * | 5/1977 | Dawson ................ C03B 9/4535 |
| | | | 137/544 |
| 4,375,669 A | * | 3/1983 | Johnson et al. ............... 700/158 |
| 4,414,758 A | | 11/1983 | Peter et al. |
| 4,508,557 A | * | 4/1985 | Fenton .................. C03B 9/3841 |
| | | | 65/262 |
| 4,579,576 A | * | 4/1986 | Jones .............................. 62/265 |
| 4,973,347 A | * | 11/1990 | Schommartz ......... C03B 9/3891 |
| | | | 65/172 |

(Continued)

FOREIGN PATENT DOCUMENTS

| | | |
|---|---|---|
| DE | 10006130 A1 | 9/2000 |
| DE | 10039343 A1 | 3/2001 |

(Continued)

OTHER PUBLICATIONS

European Search Report, Appln. No. EP12005137, Dated Aug. 25, 2014, issued in related application.

*Primary Examiner* — Richard Crispino
*Assistant Examiner* — Yana B Krinker
(74) *Attorney, Agent, or Firm* — Fox Rothschild LLP

(57) ABSTRACT

A dead plate arrangement for a glass forming machine is characterized by a housing (33) which is bordered on the upper side by a dead plate (1) which is divided into fields (16, 16', 16") intended for putting hollow glass articles to be cooled thereon, wherein to each field, a dynamic pressure chamber (3) is allocated which is connected to a supply air chamber (4) via a valve (9), and wherein the supply air chamber (4) is connected to a cooling air supply via a valve (5). The valves (5, 9) are continuously controllable between an opening position and a closed position so that the pressure can be set for each of the dynamic pressure chambers (3), and therefore the cooling capacity of each of the fields (16, 16', 16") can be set individually depending on the properties of the hollow glass article to be cooled. In connection with database-supported setpoint values for article-specific dimensioning of the cooling air flows of each field, an individual cooling capacity according to demand can be implemented which is adapted to the respective hollow glass article.

22 Claims, 3 Drawing Sheets

(56) References Cited

U.S. PATENT DOCUMENTS

| | | | |
|---|---|---|---|
| 5,073,182 A * | 12/1991 | Virey | C03B 9/3808 65/84 |
| 5,181,949 A | 1/1993 | Egloff | |
| 5,733,354 A | 3/1998 | Voisine et al. | |
| 6,173,661 B1 | 1/2001 | Vajda | |
| 6,269,662 B1 | 8/2001 | Pinkerton et al. | |
| 2007/0006617 A1 | 1/2007 | Nagai | |
| 2009/0199596 A1 | 8/2009 | Schwarzer | |
| 2010/0275702 A1 * | 11/2010 | Kinback et al. | 73/861.61 |
| 2011/0079205 A1 * | 4/2011 | Rosenberger | 123/672 |

FOREIGN PATENT DOCUMENTS

| | | |
|---|---|---|
| DE | 10101296 A1 | 8/2001 |
| DE | 10039343 B4 | 7/2008 |
| DE | 102008008630 B3 | 2/2009 |
| EP | 0153801 A1 | 9/1985 |
| EP | 1318116 A2 | 6/2003 |
| WO | 8810240 A1 | 12/1988 |

* cited by examiner

DEAD PLATE ARRANGEMENT

BACKGROUND OF THE INVENTION

The invention relates to a dead plate arrangement for a glass forming machine with a dead plate which includes a plurality of fields, each of the fields is intended for receiving a hollow glass article to be cooled thereon and is provided with openings for the passage of cooling air.

When determining the cooling capacity to be provided for the hollow glass articles arriving on the dead plate of an I.S. (individual section) glass forming machine, it must be considered that the articles to be cooled are not yet mechanically stable in terms of temperature and that measures have to be taken to achieve a safe standing position on the dead plate. In particular, cooling air that may form an air cushion underneath the articles and causes the articles to migrate or to fall over, etc., must be avoided. Thus, dimensioning the cooling capacity to be provided has to be regarded article-specifically as an optimization process which considers these sometimes countervailing influences.

This object is made difficult due to the fact that in the case of a plurality of articles produced in one station, the temperature of the articles and therefore their mechanical condition varies significantly and, accordingly, the cooling capacity used has to be readjusted repeatedly. This is a process which, in accordance with the frequency of the required adjusting measures, in particular in the case of articles to be changed frequently, can result in downtimes and, subsequent to an adjustment, in damage to the articles in the form of hot cracks which, in certain circumstances, are detected only after many hours, namely at the end of the production process after the articles have cooled down. This problem always occurs when a plurality of hollow glass articles are removed from the station (double gob, triple gob, quad gob operation), the respective temperatures of which articles vary, so that readjustments of the cooling capacity in terms of the time of standing on the dead plate are required.

Known from DE 100 39 343 B4 and U.S. Pat. No. 4,508,557 B are dead plate arrangements in which a plate table intended for standing up hollow glass articles is provided with bores for feeding cooling air. The available cooling capacity is the same for all articles. Individual treatment of an individual article is not provided. The same applies to the dead plate arrangements known from DE 101 01 296 B4 and EP 131 81 16 B1.

The dead plate arrangement known from U.S. Pat. No. 3,510,288 B is characterized by two zones which can be subjected to different amounts of cooling air and/or cooling air pressures. The dead plate arrangement known from U.S. Pat. No. 2,677,919 B is configured in a similar manner. The dead plate arrangements known from these two documents enable implementing a zone-dependent cooling capacity; however, all hollow glass articles standing in one zone are subjected to an equally identical cooling capacity.

Finally, it is known from the document DE 100 06 130 B4 to establish the controller settings for the compressed air supply during the different phases of the blow process in a glass forming machine in an article-specific manner and centralized assisted by a database so that for forming a certain hollow glass article, this data can be used. However, this control does not refer to the setting of the cooling capacity for the articles standing on a dead plate.

The cooling capacity provided according to this prior art for treating the articles standing on a dead plate therefore always acts in an averaged and uniform manner on a plurality of articles. A potential individually differentiated demand of cooling capacity cannot be implemented in this manner.

SUMMARY OF THE INVENTION

It is an object of the invention to configure a dead plate arrangement according to the preamble of the claim 1 in such a manner that the cooling air flow acting on the individual hollow glass article is dimensioned individually and therefore according to demand. Thus, it is the aim to eliminate the disturbing influence of varying starting temperatures of the hollow glass articles to be cooled when dimensioning the cooling capacity to be applied. This object is achieved by a dead plate arrangement for a glass forming machine with a dead plate which includes a plurality of fields intended in each case for putting hollow glass articles to be cooled thereon and which is provided with openings for the passage of cooling air, and with a cooling air supply. Each field is allocated a dynamic pressure chamber which is individually controllable with regard to its pressure.

According to this, it is essential for the invention that each field of the dead plate intended for setting down a hollow glass article is equipped with a dynamic pressure chamber, the pressure of which can be controlled individually so that the cooling air flow field-specifically exiting the dead plate can be adjusted by varying the pressure in the dynamic pressure. Thus, it is possible to provide different cooling air flows and therefore different cooling capacities for each field of the plurality of fields of the dead plate. Based on the knowledge of the condition of the hollow glass article it is therefore possible to implement a cooling according to demand which takes said condition into account.

According to additional features of the invention, the dynamic pressure chambers together with a supply air chamber which all dynamic pressure chambers have in common are located in a common housing below the dead plate. The supply air chamber is pressurized via a cooling air supply and serves for distributing the cooling air among the individual dynamic pressure chambers.

According to further features of the invention, the supply air chambers and the dynamic pressure chambers are in each case equipped with motor-driven valves which can be continuously controlled between an open position and a closed position. Thus, cooling air supply into the supply air chamber and likewise the cooling air supplies into the dynamic pressure chambers can be controlled independently of one another, for example, with the goal to implement in the individual fields of the dead plate a cooling capacity that is uniform, reproducible and adapted to the individual hollow glass article.

In yet another feature of the invention, the drives allocated to the valves are at least partially integrated in the housing below the dead plate. Thus, said valves are arranged protected against the atmosphere of a glass factory which is characterized by heat and abrasively acting dust.

Other embodiments of the invention are directed to the implementation of a maximum cooling air flow which is in each case allocated to a field of the dead plate, which flows out through an overflow channel, and which is available as cooling medium in addition to the cooling air which flows out through the valve of the field. This maximum cooling air flow is used for cooling the hollow glass article which is at first held in a take out gripper above the field during a defined period of time and which is mechanically still instable due to temperature reasons. As soon as the hollow glass article has been put down onto the field, the overflow channel is closed so that cooling in the following period takes place only by means of the cooling air flow flowing out of the valve of the field. Preferably, a switching mechanism actuated by pressure means and formed by an annular piston is allocated to the overflow channel. However, using other switching mechanisms at this point is not excluded.

The features of another embodiment are directed to an exemplary constructional embodiment of the valve of a field, the switching element of which is formed by an orifice plate. However, other valves which are continuously controllable between an open position and a closed position can also be used at this point.

According to the features of additional embodiments, the dynamic pressure chambers and the supply air chambers are equipped with sensors for measuring pressure and temperature, wherein the measured variables detected in this manner can be used as a basis for article- or field-specifically controlling the cooling capacity made available in a field of the dead plate.

Further measured variables which can be used are the temperature of the hollow glass article held in the take out gripper and the ambient temperature.

According to the features of another embodiment, a control unit is provided in which in a data storage, the parameters of the cooling process on the dead plate are in each case article-specifically stored and can be used for defining setpoint values. Also to be controlled in this connection, apart from the cooling air flows, are the time periods in which the hollow glass article in the take out gripper is exposed to the maximum cooling air flow as well as the time period based thereon. What is sought is a state of the article which is characterized by a sufficient mechanical stability so as to be able to place the article onto the dead plate without the risk of damage. For this purpose, the control unit is at least connected to the pressure sensors of the dynamic pressure chamber and the supply air chamber.

According to other features of the invention, the control unit is in addition connected to the temperature sensors of the dynamic pressure chamber and/or the supply air chamber. In this manner, a better control can be implemented which compensates the fluctuating temperatures.

In another embodiment of the invention, a first control circuit is provided which relates to the individual pressure control of the dynamic pressure chambers and the setpoint values of which are field-specifically formed by the datasets which are article-specifically filed in the data storage. Each of the dynamic pressure chambers is allocated such a control circuit.

According to the features of still more embodiments of the invention, such a control circuit can also be provided for the supply air chamber. Furthermore, such a pressure control can be improved with regard to the implementation of a constant cooling capacity by a second control circuit which is subordinate to the first control circuit and considers the temperature of the respective dynamic pressure chamber and/or supply air chamber. The output variable of the first control circuit forms here a command variable for the second control circuit. In this manner, namely by adding further influencing variables such as, e.g., the temperature of the hollow glass article held in the take out gripper, the ambient temperature, etc., further subordinate control circuits and control circuits eliminating disturbances can be connected to the final control variable acting on the control elements of the cooling air flows.

The variables of the cooling air flow to be controlled also comprise the time periods during which the hollow glass articles are held in the take out gripper or, while standing upright on the field of the dead plate, are exposed to the cooling air flow in the respective field so that the overall goal of the control is to be seen in the implementation of a reproducible heat dissipation according to demand which is adapted to the hollow glass article, in particular to the form and the temperature of the hollow glass article.

BRIEF DESCRIPTION OF THE INVENTION

The invention is explained in more detail hereinafter with reference to the exemplary embodiment illustrated in the drawings. In the figures.

DETAILED DESCRIPTION OF THE INVENTION

Figure 1:
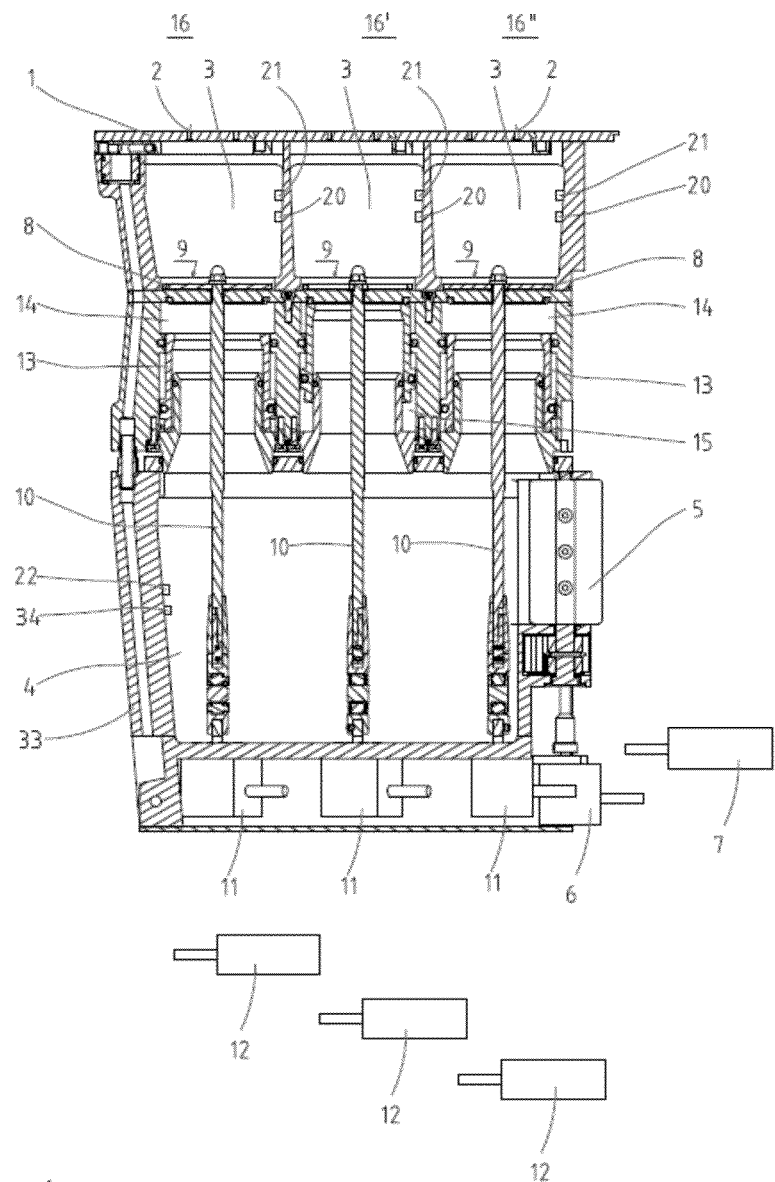
FIG. 1 shows a dead plate according to the invention in a vertical section.
Figure 2:
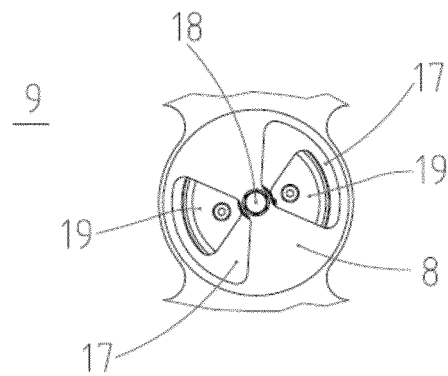
FIG. 2 shows a detail II of FIG. 1 in an enlarged illustration.

Designated with 1 in FIG. 1 is a dead plate which is provided in a manner known per se with openings 2 for feeding cooling air and is intended for putting hollow glass articles thereon in an upright position.

The usable surface area of the dead plate 1 for setting down hollow glass articles is divided into fields 16, 16', 16", which individually correspond to a hollow glass article to be set down and to which in each one dynamic pressure chamber 3 corresponds which is set up below the dead plate 1, wherein the size and other conditions of all dynamic pressure chambers 3 can be designed identically.

Designated with 4 is a supply air chamber which is intended for supplying all dynamic pressure chambers 3 and to which cooling air is fed through a valve 5 (also referred to as a cooling air supply valve 5 to distinguish from other valves described herein). The position of this valve 5 can be controlled via a gear unit 6 by means of a motor 7. Connected to the valve 5 is a cooling air supply which is not illustrated for the sake of clarity.

The supply air chamber 4 is connected in each case to the individual dynamic pressure chambers 3 via a valve 9 (also referred to as an air chamber valve 9 to distinguish from other valves described herein) equipped with an orifice plate 8, wherein each valve 9 can be controlled individually via a shaft 10 which is in each case connected to a motor 12 via a gear unit 11.

Extending from the supply air chamber 4, each of the valves 9 is allocated an annular piston 13 which is movable, namely parallel to the shafts 10, between a first position, which is the lowermost position in the drawing in which an overflow channel 14 is unblocked, and a second position which is the uppermost position in the drawing in which the overflow channel 14 is blocked. In the mentioned first position, a maximum cooling air flow is present which exists through the hollow annular piston 13 and depending on the position of the valve 9 through said valve and in addition through the overflow channel 14. In the mentioned second position, the overflow channel 14 is closed so that cooling air can only exit the respective dynamic pressure chamber 3 depending on the position of the valve 9.

Each of the annular pistons 13 can be controlled individually in a pressure-means-actuated manner so that pressurization of each of the three dynamic pressure chambers 3 illustrated in FIG. 1 can take place individually. Instead of a pressure-means-actuated activation, an electrically driven or motor-driven embodiment of activation can also be considered. Representing the associated annular chambers 15 for pressurizing the individual annular pistons 13 and likewise illustrating an electric activation has been omitted for the sake of clarity of the drawing.

It is apparent that the cooling air flows which individually flow out of in each case one field 16, 16', 16" which is intended for putting a hollow glass article onto the dead plate 1 can be controlled, for example, depending on the type of the hollow glass article standing in each case thereon, namely by adequately activating the individual valves 9.

The valves 9 are continuously controllable between an open position and a closed position, namely by activating the motors 12. For this purpose, the mentioned orifice plate 8 in the illustration shown is provided with two equally-configured, circle-sector-shaped recesses 17 and is connected with the respective shaft 10 in a rotationally fixed manner so that by rotating about the axis 18 of the respective shaft 10, the recesses 17 can be brought in a position overlapping the openings 19 in the wall of the dynamic pressure chamber 3 thereby establishing a continuous flow path that extends from the dynamic pressure chamber 3.

Designated with 20 is a pressure sensor, wherein such pressure sensor 20 is fixedly arranged in each of the dynamic pressure chambers 3. Designated with 21 is a temperature sensor, wherein such temperature sensor 21 is fixedly arranged in each of the dynamic pressure chambers 3. Designated with 22 is a pressure sensor which is fixedly arranged within the supply air chamber 4. Finally, the supply air chamber 4 can also be equipped with a fixedly arranged temperature sensor 34.

Not illustrated in the drawing is a control unit which comprises a CPU (Central Processor Unit) and together with the pressure sensors 20, 22, the temperature sensors 21, 34 and the motors 7, 12 forms a control circuit which is characterized by command variables which are at least article-specifically stored in the CPU and ensure a cooling air setting according to demand.

The dynamic pressure chambers 3, the supply air chamber 4 and the motors 7, 12 can advantageously be arranged in a housing 33 which is closed on the upper side by the dead plate 1.

The mode of operation of the above-described dead plate arrangement is briefly explained hereinafter:

The supply air chamber 4 is permanently subjected to a cooling air flow, wherein a maximum value of the cooling air flow is defined by the position of the valve 5. The hollow glass article which is removed from the machine station of an I.S glass forming machine by means of a take out gripper and which is still mechanically instable is at first held by means of the gripper above the dead plate 1 during a selectable period of time so as to improve the mechanical properties of said article. During said period of time, the annular piston 13 of the respective field 16, 16', 16" is moved into the lowermost position thereby opening the overflow channel 14 and exerting a maximum cooling effect on the hollow glass article. After the mentioned time interval has elapsed, the hollow glass article is put onto the dead plate 1 by means of the gripper while the annular piston 13 is moved into its uppermost position at the same time thereby closing the overflow channel 14.

In this operating phase, the upright standing hollow glass article is subjected to a cooling air flow which is quantitatively determined by the position of the respective valve 9.

In order to ensure a constant maximum heat dissipation during the residence time of the hollow glass article in the gripper above the dead plate 1, the maximum cooling air flow available through the supply air chamber 4 is controlled by means of the pressure sensor 22 by adequately setting the valve 5, and if necessary, is field-specifically compensated by means of the temperature sensors 21.

Subsequently, the hollow glass articles are put onto the individual fields 16, 16', 16" of the dead plate 1, wherein the respective annular pistons 13 are moved into their uppermost position so that from this point on, cooling air flows out only through the valves 9, namely depending on the dynamic pressure occurring in the individual dynamic pressure chambers 3, said dynamic pressure being used as a measured value for dimensioning the cooling air flow for a hollow glass article standing upright in the respective field 16, 16', 16". Depending on the type of the respective hollow glass article standing thereon, the field-specific cooling air flow is determined based on an article-specific setpoint value stored in a CPU (Central Processor Unit) and is adjusted by means of respective motors 12 via the respective shaft 10. The setpoint value required for the motors 12 depending on the cooling air flow to be implemented is also stored in the CPU. By means of the temperature values detected via the temperature sensors 21 in the dynamic pressure chambers 3, the pressure value can be corrected, if necessary, namely with the goal of achieving a constant heat dissipation. Further correction possibilities are given due to the measurement results of the temperature sensor 24 of the supply air chamber 4.

Since adjusting the cooling air flow in a field 16, 16', 16" always influences the cooling air flows of the other fields, adjusting the cooling air flows is carried out sequentially. Thus, at first only a first cooling air flow is adjusted, then a second one, etc.

Figure 3:
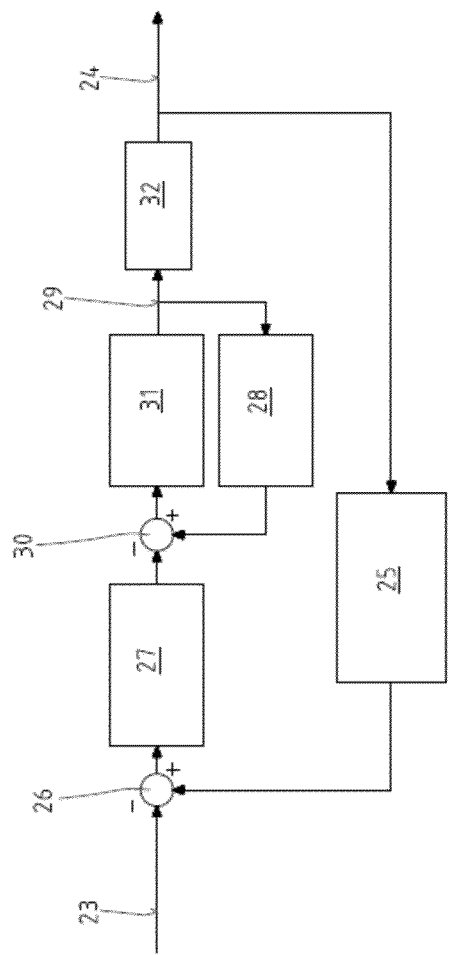
FIG. 3 shows a block diagram of a database-supported cooling air control for a dead plate arrangement according to FIG. 1.

On the basis of further temperature sensors or also by means of methods of computer-aided image evaluation, the control system structured as described above can be developed into a fully automatic operation by determining optimal setpoint values for setting the cooling air flow and providing said setpoint values as a basis for the following process, said setpoint values being determined from measured variables, for example, the temperature of the hollow glass article retained in the take out gripper, By means of a circuit diagram, FIG. 3 shows exemplary the basic structure of a field-individual control system for setting a cooling air flow.

Starting point at the point 23 are the values stored in a database for the pressure in the individual dynamic pressure chambers 3 including the pressure value in the supply air chamber 4 which describes the maximally implementable cooling air flow. Thus, at said point 23, the article-specific setpoint values are defined, wherein it is assumed that in each case information is available with regard to the hollow glass article to be put down in this moment in a particular field 16, 16', 16".

At the point 24, the respective control variable, namely the actual value thereof, is present, wherein with regard to the illustrated exemplary embodiment, these actual values are the pressures $p_1, p_2, p_3$ of the three dynamic pressure chambers 3 and the pressure $p_z$ in the supply air chamber 4. These four actual values are converted in a circuit 25 and are converted in a first summation point 26 for obtaining in each case a value describing a first control deviation which is converted in a first control circuit 27 for obtaining a first control variable.

Designated with 28 is a circuit which is set up for converting actual values with regard to the temperatures $T_1, T_2, T_3$ of the dynamic pressure chambers and $T_z$ of the supply air chamber 4 which are obtained at the point 29 and which are used in a second summation point 30, together with the command variable for the second control circuit 31 generated on the output side by the first control circuit 27, for forming a second control deviation. This second control variation, which describes the second control deviation, is used in the second control circuit 31 for creating an input signal for actuators 32 which act in each case on function elements which are intended for influencing the mentioned temperature and pressure values.

Thus, this involves a pressure control which is subordinated by a temperature control which aims for compensating a temperature influence. The control is database-supported and configured with regard to an article-specific setting of cooling air flows so as to provide reproducible cooling capacities or heat dissipations which are adapted to the article.

If necessary, the shown control system can be refined by including further correction variables in the control algorithm such as, e.g., the article temperature in the take out gripper, the residence time therein, the ambient temperature, etc.

| Reference list: | |
|---|---|
| 1. | Dead plate |
| 2. | Opening |
| 3. | Dynamic pressure chamber |
| 4. | Supply air chamber |
| 5. | Valve |
| 6. | Gear unit |
| 7. | Motor |
| 8. | Orifice plate |
| 9. | Valve |
| 10. | Shaft |
| 11. | Gear unit |
| 12. | Motor |
| 13. | Annular piston |
| 14. | Overflow channel |
| 15. | Annular chamber |
| 16. | Field |
| 16'. | Field |
| 16". | Field |
| 17. | Recess |
| 18. | Axis |
| 19. | Opening |
| 20. | Pressure sensor |
| 21. | Temperature sensor |
| 22. | Pressure sensor |
| 23. | Point |
| 24. | Point |
| 25. | Circuit |
| 26. | Summation point |
| 27. | Control circuit |
| 28. | Circuit |
| 29. | Point |
| 30. | Summation point |
| 31. | Control circuit |
| 32. | Actuators |
| 33. | Housing |
| 34. | Temperature sensor |

The invention claimed is:

1. A dead plate arrangement for a glass forming machine, comprising:
   a dead plate which includes a plurality of fields for receiving a plurality of hollow glass articles to be cooled thereon, each of said fields configured for receiving one of said hollow glass articles,
   openings in said dead plate directed to the fields for the passage of cooling air directly to said hollow glass articles,
   a cooling air supply for providing cooling air to said openings, and
   a plurality of dynamic pressure chambers, each of said plurality of fields being allocated to one of said dynamic pressure chambers, each of said plurality of dynamic pressure chambers being configured to be individually controllable with regard to a cooling air pressure therein.

2. The dead plate arrangement according to claim 1, further comprising a housing attached to the lower side of the dead plate in which the dynamic pressure chambers and a supply air chamber connected to the cooling air supply are arranged.

3. The dead plate arrangement according to claim 2, wherein the supply air chamber includes a pressure sensor.

4. The dead plate arrangement according to claim 2, wherein the supply air chamber includes a temperature sensor.

5. The dead plate arrangement according to claim 2, wherein each of said dynamic pressure chambers is connected to the supply air chamber via an air chamber valve which is continuously controllable between an open position and a closed position.

6. The dead plate arrangement according to claim 5, further comprising a cooling air supply valve which is continuously controllable between a closed position and an open position for controlling the air flow from said cooling air supply, and wherein each of the air chamber valves and cooling air supply valve is allocated a motor drive.

7. The dead plate arrangement according to claim 6, wherein each air chamber valve has an orifice plate which is rotatable about an axis and is provided with recesses, and wherein openings are provided in a wall of the dynamic pressure chamber with the proviso that by rotating the orifice plate about the axis, an opening state of the valve can be established in dependence on an overlap of the openings and the recesses.

8. The dead plate arrangement according to claim 6, wherein the drives allocated to the air chamber valves and the cooling air supply valve are at least partially integrated in the housing.

9. The dead plate arrangement according to claim 1 further comprising a cooling air supply valve which is continuously controllable between a closed position and an open position for controlling the air flow from said cooling air supply.

10. The dead plate arrangement according to claim 1, wherein each said dynamic pressure chamber includes a temperature sensor.

11. The dead plate arrangement according to claim 1, wherein each said dynamic pressure chamber includes a pressure sensor.

12. The dead plate arrangement according to claim 11, further comprising a control unit which has a data storage and is at least connected to the pressure sensors of each dynamic pressure chamber, wherein the data storage is set up for storing hollow-glass-article-specific, cooling related parameters and for generating setpoint values related in each case to field-specific cooling air flows.

13. The dead plate arrangement according to claim 12, wherein each said dynamic pressure chamber includes a temperature sensor and the control unit is additionally connected to at least the temperature sensors of the dynamic pressure chambers.

14. The dead plate arrangement according to claim 12, wherein for a field- and hollow-glass-article-specific cooling, a first control circuit is set up, the setpoint value of which is a pressure value for the respective dynamic pressure chamber taken from the data storage of the control unit, which said pressure value is compared with the respective actual value of the dynamic pressure value chamber and can be converted as a control variable for adjusting the opening of the air chamber valve.

15. The dead plate arrangement according to claim 14, wherein subordinate to the first control circuit there is a second control circuit which, in accordance with the actual value of the temperature of the cooling air in the respective dynamic pressure chamber, modifies the control variable of the first control circuit.

16. The dead plate arrangement according to claim 11, further comprising a control unit which has a data storage and is connected to the pressure sensors of each dynamic pressure chamber and of the supply air chamber, wherein the data storage is set up for storing hollow-glass-article-specific, cooling related parameters and for generating setpoint values related in each case to field-specific cooling air flows.

17. The dead plate arrangement according to claim 16, wherein for a field- and hollow-glass-article-specific cooling, a first control circuit is set up, the setpoint value of which is a pressure value for the respective dynamic pressure chamber taken from the data storage of the control unit, which said pressure value is compared with the respective actual value of the dynamic pressure value chamber and can be converted as a control variable for adjusting the opening of the air chamber valve.

18. The dead plate arrangement according to claim 17, wherein the pressure control in the supply air chamber is also included in the first control circuit.

19. The dead plate arrangement according to claim 17, wherein said supply air chamber includes a temperature sensor, and wherein subordinate to the first control circuit there is a second control circuit which, in accordance with the actual value of the temperature of the cooling air in the supply air chamber, modifies the control variable of the first control circuit.

20. A dead plate arrangement for a glass forming machine, comprising:
   a dead plate which includes a plurality of fields for receiving a plurality of hollow glass articles to be cooled thereon, each of said fields configured for receiving one of said hollow glass articles,
   openings in said fields for the passage of cooling air to said hollow glass articles,
   a cooling air supply for providing cooling air to said openings,
   a plurality of dynamic pressure chambers, each of said plurality of fields being allocated to one of said dynamic pressure chambers, each of said plurality of dynamic pressure chambers being configured to be individually controllable with regard to a cooling air pressure therein,
   a housing attached to the lower side of the dead plate in which the dynamic pressure chambers and a supply air chamber connected to the cooling air supply are arranged, wherein each of said dynamic pressure chambers is connected to the supply air chamber via an air chamber valve which is continuously controllable between an open position and a closed position,
   an overflow channel enabling the cooling air flow to exit via the respective field of the dead plate by bypassing the respective air chamber valve, and a pneumatically actuatable switching mechanism configured for opening and closing the overflow channel.

21. The dead plate according to claim 20, wherein the switching mechanism is formed by an annular piston which is arranged displaceably between a position opening the overflow channel and a position closing the same.

22. The dead plate arrangement according to claim 21, wherein the annular piston is configured to allow a central flow of cooling air to flow therethrough depending on the open position of the air chamber valve.

* * * * *